Dec. 13, 1927.          1,652,254
J. SCHLAGENHAUF
AUTOMATIC BRAKE FOR TRAILERS
Filed Dec. 18, 1924
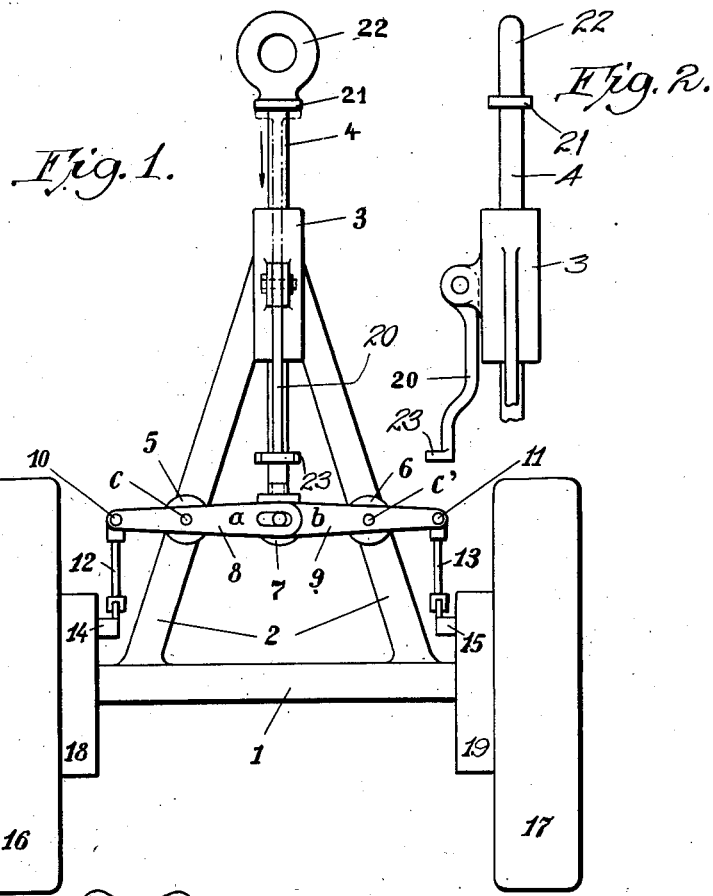
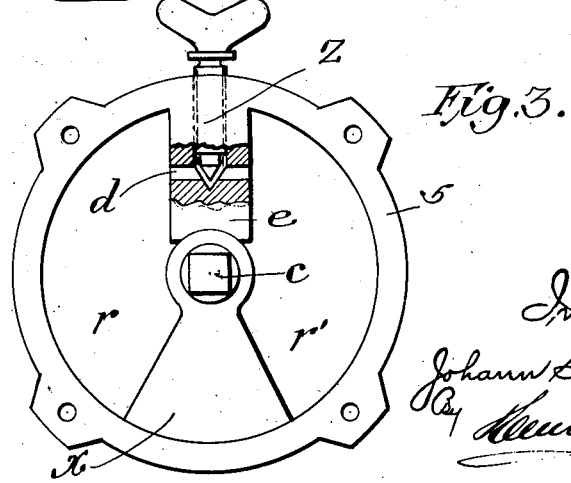
Inventor,
Johann Schlagenhauf,
By Henry Orth
Atty.

Patented Dec. 13, 1927.

1,652,254

UNITED STATES PATENT OFFICE.

JOHANN SCHLAGENHAUF, OF BAUHOF, OERLIKON, NEAR ZURICH, SWITZERLAND.

AUTOMATIC BRAKE FOR TRAILERS.

Application filed December 18, 1924, Serial No. 756,751, and in Germany December 29, 1923.

The well-known automatic brakes for trailers, which have a connecting rod with end play, held in a certain position by spiral springs when not in use, have the disadvantage that even a comparatively slight pressure on the connecting rod brings them into play, and, vice versa, when the pressure on the connecting rod ceases, the brake is removed with a jerk. This causes shocks, which have a bad effect on the vehicle.

The present invention is intended to remove this disadvantage in the following way; special hydraulic brakes of the kind already known are inserted in the brake rods at suitable parts of the trailer, between the connecting rod and the braking device.

Referring to the accompanying drawings—

Figure 1 is a plan view of the brake mechanism, and

Fig. 2 is a detail side view of the connecting rod, its hub member and catch.

Fig. 3 is a view showing the interior of the hydraulic regulators.

On the axle 1 of a two-wheeled trailer (the body of which is not shown) is a fork 2 with a hub 3 in which is fixed a connecting rod 4. The rod 4 is connected by a pin and slot connection with the ends a b of two-armed levers, 8, 9. The ends 10, 11 of these levers are connected by links 12, 13, with the brake blocks 14, 15, respectively, which act on the brake drums 18, 19 of the wheels 16, 17. At the fulcrum points c c' of the two-armed levers 8, 9, there are hydraulic brakes of the kind already known, which are put in action by the levers. These brakes regulate the swing of the levers.

The hydraulic brakes or regulators 5, 6, consist of a casing 5, Fig. 3, having a radial stationary partition e having a transverse passage d controlled by a regulating screw z. Journaled in the cylindrical casing 5 at c is a plate x extending from the inner end of the partition e to the inner wall of the casing 5.

The journal end is squared to enter a corresponding hole or recess in its actuating lever.

It is obvious that the operation of this well known construction will cause a movement of liquid from the chamber r through the throttling opening d into the chamber r', and vice versa, when the plate x is moved from its mid-position, shown in Fig. 3.

The braking device acts as follows:

If for any reason the trailer is pushed against the vehicle to which it is attached, the rod 4 is pressed backwards in the direction of the arrow, the outer ends 10 and 11 of the levers 8, 9, swing in the opposite direction (the intervening regulating hydraulic brakes 5, 6, which act on the levers cause the brakes to come on and off more slowly) and the brake blocks act. When the pressure on the rod 4 ceases, the brake blocks are released from the brake drums (18, 19).

It sometimes happens that it is desired to move the trailer backwards by means of the vehicle without bringing the brake of the trailer into action. For this purpose a lock device for the connecting rod is fixed to the fork 2. It consists of a movable catch 20, the free forked end 23 of which can be so placed against the flange 21 of the eyelet 22 that the rod 4 cannot be forced backwards.

I claim—

1. Automatic brake for trailers, comprising a traction rod longitudinally movable of the trailer, brakes for the trailer wheels, levers operatively connected to the brakes and having a pin and slot connection to said rod, and hydraulic retarding means retarding the pivotal movement of the levers, the axis of the operating member of said retarding means forming the pivotal axis of said levers.

2. Automatic brake for trailers, comprising a traction rod longitudinally movable of the trailer, brakes for the trailer wheels, levers connecting the rod and brakes, hydraulic means retarding the pivotal movement of the levers, and a forked member pivoted to the trailer whose end when swung into operative position engages the traction rod and prevents the latter from moving longitudinally of the trailer.

In testimony that I claim the foregoing as my invention, I have signed my name.

JOHANN SCHLAGENHAUF.